United States Patent [19]
Long

[11] 3,877,607
[45] Apr. 15, 1975

[54] ELECTRONIC COPY SENDER

[75] Inventor: James Long, Orlando, Fla.

[73] Assignee: Sentinel Star Company, Orlando, Fla.

[22] Filed: July 13, 1973

[21] Appl. No.: 379,141

[52] U.S. Cl. .................. 221/12; 221/112; 221/124; 221/129
[51] Int. Cl. ............................................ B65h 43/08
[58] Field of Search ....... 221/12, 129, 112, 90, 130, 221/124; 312/124, 223

[56] References Cited
UNITED STATES PATENTS

| 818,296 | 4/1906 | Rule | 221/90 |
|---|---|---|---|
| 2,006,390 | 7/1935 | Gebert et al. | 221/90 |
| 3,371,821 | 3/1968 | Abood, Jr. et al. | 221/129 X |
| 3,529,745 | 9/1970 | Freeman et al. | 221/90 |

*Primary Examiner*—Robert B. Reeves
*Assistant Examiner*—David A. Scherbel

[57] ABSTRACT

A series of pockets are stacked in tiers forming pigeon holes designed for receiving and holding printed material deposited therein from a central area known as the distribution station. Passage through each of said pockets is prevented by means of a movable gate. Remote operation of said gate sequentially releases the contents of each pocket onto a conveyor belt moving behind the tiers. The gates are operated by persons remotely located in positions along the conveyor belt. One of the tiers of pockets is given priority over the remaining tiers. A photo-electric means senses the presence of printed material within these priority pockets and switches sequential control from the regular pockets to the priority pockets whereupon printed material is distributed to users from the priority pockets. The photo-electric system switches control back to regular pockets upon completion of the priority sequence picking up where the regular sequence was interrupted.

13 Claims, 5 Drawing Figures

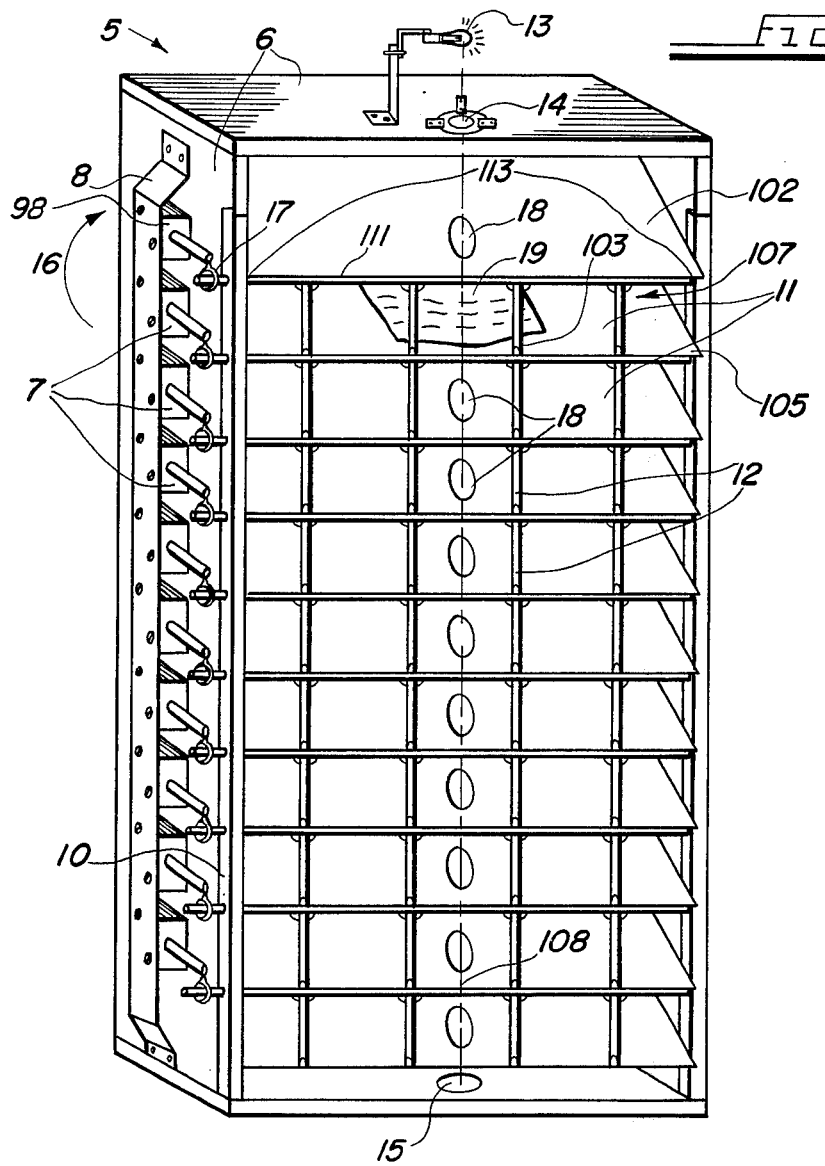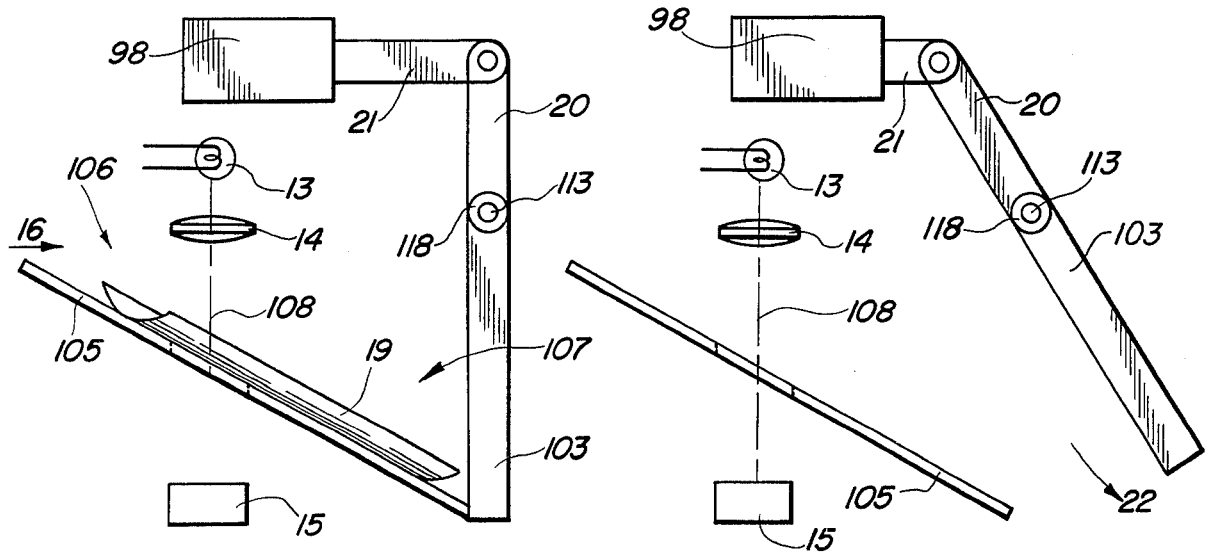

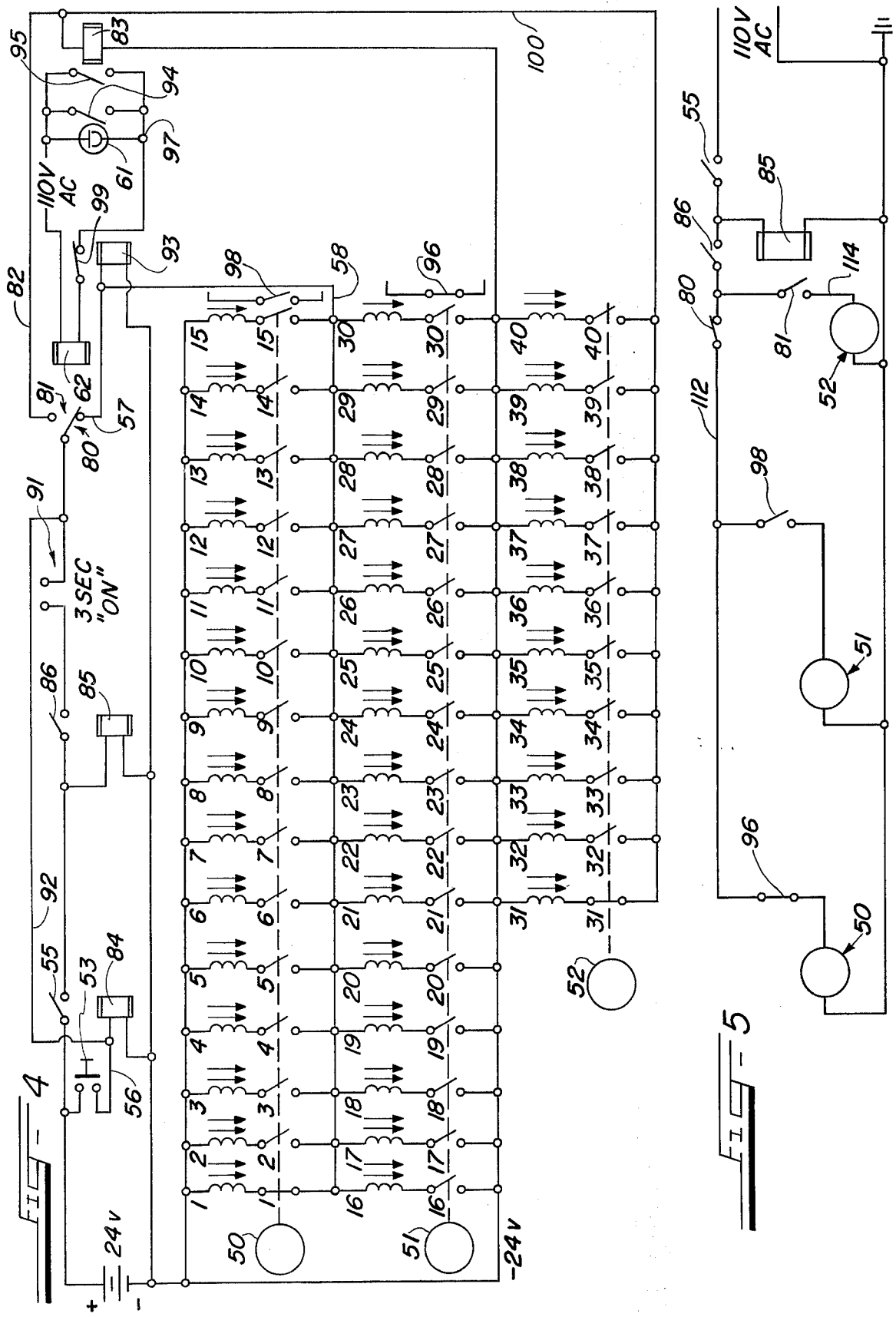

ELECTRONIC COPY SENDER

BACKGROUND OF THE INVENTION

1. Field of the Invention

The present invention relates to electro-mechanical systems for distributing written material along a conveyor belt to proofreaders and/or typists, and more particularly to a system for sequentially accomplishing such distribution.

2. Description of the Prior Art

The idea of automatically dispensing material from a matrix of inclined ramps onto a conveyor belt assembly for distribution to remote points is not new. For example, U.S. Pat. No. 2,952,195 — Faulkner discloses and discusses such a system for dispensing packages or the like. The Faulkner system is designed to dispense such articles in a selected pattern from an array of storage bins. Another example of the use of a conveyor assembly in association with a rack of storage spaces is U.S. Pat. No. 3,624,792 — Lipfert. The Lipfert apparatus provides for selected dispensation of material from individual storage racks in accordance with a decimal coding system keyed to each row and column of the storage racks. These systems, similar to the present development in some respects, have found their major application in areas of inventory retrieval. For such an application it is necessary to initiate release of the items in inventory to the conveyor belt in accordance with some predetermined coding system or inventory storage system. The present development, however, differs from that of the prior art in that its application is in the distribution of written material on a first in, first out basis. In the distribution of written material certain material must frequently be given priority over other material and there is therefore a need for a priority system for distributing this priority material with preference over other material to typists or proofreaders. The present development fulfills both the need for first in, first out distribution and the need for priority distribution by providing a system for sequentially distributing written material to various points within a room while at the same time distributing selected material with preference over normally handled materials. This ability to distribute material sequentially along with the ability to transfer control from normally distributed material to specially designated material forms the basis for distinguishing the present development from the prior art.

BRIEF SUMMARY OF THE INVENTION

In accordance with the present invention, an electric copy sender for sequentially distributing written material has been designed comprising a group of tiers placed side by side each having a series of pockets into which written material is inserted and held for subsequent sequential release. Remotely operable transducers control the release of written material from the pockets. A series of stepping switches select one transducer from an array of transducers for operation. A photo-electric cell associated with one of the tiers of pockets operates a priority switching circuit which interrupts the normal sequence in favor of a priority sequence when a light beam is broken by paper inserted in the priority tier. The normal sequence is resumed from the point of interruption when the priority sequence is complete. A transport system carries written material released from pockets to remote points within the area of operation.

Thus, it is the primary object of the present invention to provide a means of sequentially distributing written material to typists, proofreaders, or the like along a conveyor belt.

Another object of the present invention is to provide an efficient means of assigning priorities to various pieces of written material for subsequent proofreading or typing.

Yet another object of the present invention is to provide a means of assigning priority to various pieces of written material so that said pieces of written material can be proofread or typed with preferential treatment over other material.

Still another object of the present development is to provide a means of transferring from a normal operating mode to a priority mode and automatically reverting back to the normal mode, picking up the sequence where it had originally been interrupted.

These and other objects, advantages and other features of the present invention will hereinafter appear, and for the purpose of illustration, but not for limitation, exemplary embodiments of the present invention are illustrated in the accompanying drawings.

BRIEF DESCRIPTION OF THE DRAWINGS

FIG. 1, is an isometric view of the rear of a single tier of pockets showing the incline shelves, gating means, and solenoid location.

FIG. 2, is a cutaway of one of the pockets and its associated bearing mounted gating means and solenoid in the rest position.

FIG. 3, is the same pocket as that of FIG. 2 with its associated gating means and solenoid in the activated position.

FIG. 4, is a skematic representation of the electrical circuitry incorporated in the present development.

FIG. 5, is a skematic representation of the stepping motor control circuitry of the present invention.

DETAILED DESCRIPTION OF THE PREFERRED EMBODIMENTS

With reference to FIG. 1, pocket module 5 comprises rectangular housing and shelf support 6 forming a box structure housing and supporting a series of inclined pocket shelves 11. Pocket shelf 102 and pocket shelf 105 form the top and bottom respectively of pocket 107 which is bound on its sides by rectangular housing and shelf support 6. Paper 19 is inserted into pocket 107 from the front 16 of the module 5 and prevented from sliding through pocket 107 by gate 103. Gate 103 is movably mounted at the ends 113 of its upper edge 111 in bearing block 10. Electric solenoids 7 are rigidely mounted to rectangular housing and shelf support 6 by solenoid bracket 8 and operably connected to the bearing mounted gates 12 by solenoid piston and lever linkage 17.

In normal operation, paper 19, inserted from the front 16 of the module 5 into pocket 107, is prevented from sliding off incline shelf 105 by bearing mounted gate 103. Referring to FIG. 1, as solenoid 98 is energized, the solenoid piston linkage 17 causes gate shaft 111 to rotate within bearing block 10 until gate 103 is in its second or open position.

The operation of exemplary slot 107 is illustrated in more detail in FIGS. 2 and 3. In FIG. 2, paper 19 is inserted into pocket 107 as indicated by arrow 106. The paper 19 rests on pocket shelf 105 and urges up against pocket gate 103 which is movably mounted at its ends 113 in shaft end bearings 118. As solenoid 98 is energized, solenoid piston 21 is drawn into solenoid 98 pulling lever arm 20 in the direction of solenoid 98 thereby causing gate 103 to assume its second position shown in FIG. 3. As gate 103 assumes its second position shown in FIG. 3, paper 19 is allowed to slide out of pocket 107 through the opening 22 created between gate 103 and the lower edge of the shelf 105 and fall to a conveyor for distribution to some remote point.

The priority module or tier is identical to the module 5 of FIG. 1 except that the shelves of the priority module define a series of holes 18 shown in FIG. 1 to allow a light beam 108 generated by light source 13 and focused by lense 14 to pass through the holes 18 to the photo-cell 15. In normal operation the solenoids 7 are energized one at a time beginning at the top of each tier and proceeding to the bottom of each tier. This normal sequence of operation is interrupted by insertion of paper in one of the priority pockets. As illustrated in FIG. 2, paper 19 inserted in a priority pocket breaks light beam 108 thereby initiating electrical switching operations for transferring control from one of the regular tiers to a priority tier as will be described in more detail below. As the paper 19 slides through opening 22 shown in FIG. 3, light beam 108 is allowed once again to fall on photo-cell 15 initiating switching operations to transfer control back to normal sequence.

Referring to FIG. 4, release of paper in the regular mode of operation from the electric copy sender is initiated by depressing push-button 53 located at the desk of a typist or proofreader. Depressing push-button 53 allows current to pass along line 56 to relay 84 which closes switch 55. Closed switch 55 allows current to energize relay 85, which closes switch 86 thereby engaging three second timer 91. Current flowing from the three second timer back along path 92 insures that relays 84 and 85 remain energized after push-button 53 is released thereby holding switches 55 and 86 closed for the full three second timing period. Current flowing from the three second timer 91 is also allowed to pass through normally closed relay switch 80 along current path 57 energizing relay 93 and opening normally closed switch 99 and passing current to line 58. Current line 58 carries current to each of the stepping switches 1 through 30 corresponding to pockets 1 through 30 of three ten-shelf modules identical to the module 5 of FIG. 1. These three modules are used for normal distribution of written matter in the preferred embodiment. As shown in FIG. 4, stepping motor 50, driving stepping switches 1 through 15, is in its initial or starting position with switch 1 corresponding to solenoid 1 closed for operation of the gate corresponding to pocket 1. Energizing solenoid 1 opens gate 1 emptying pocket 1 to the conveyor belt whereupon three second timer 91 switches off, cutting current flow along path 92 to relays 84 and 85 thereby opening switches 55 and 86 respectively. As will be explained subsequently with reference to FIG. 5, stepping motor 50 then moves to its next position closing stepping switch 2 corresponding to solenoid 2. Stepping switch 50 continues to advance with each subsequent pressing of push-button 53 releasing the contents of the corresponding pockets 1 through 15 in sequence until stepping motor 50 reaches its 16th position corresponding to switch 98 whereupon it energized stepping motor 51 by closing switch 98. Stepping motor 51 advances one position opening previously closed switch 96 and closing switch 16. Stepping motor 51 follows a sequence of operations similiar to that of stepping motor 50 sequentially energizing switches 16 to 30 until it reaches its last or 16th position corresponding to switch 96 which, when closed, re-energizes stepping motor 50 starting the 30 step sequence over again. This operation continues time and time again until paper is inserted in one of the priority pockets.

As paper is inserted in one of the priority slots, the light beam falling on photo-cell 61 is broken causing normally open photo-cell switch 94 to close allowing current to pass from the source to point 97 and on through normally closed switch 99 to energize relay 62. In the priority mode as push-button 53 is depressed relays 84 and 85 are energized closing switches 55 and 86 respectively engaging three second timer 91 as described with reference to the normal mode. Current passes along line 92 back to relays 84 and 85 holding switches 55 and 86 closed for the three second time interval. With relay 62 energized, however, normally closed switch 80 is open and normally open switch 81 is closed allowing current to pass along current path 82 energizing relay 83 thereby closing switch 95. Thereafter the current traveling along current path 82 continues along current path 100 to priority stepping switches 31 through 40. Stepping motor 52 is shown in its initial position with stepping switch 31 closed allowing current following along current path 100 to pass through priority solenoid 31, releasing the contents of pocket 31 to the conveyor belt.

As the three second timer 91 goes off, current ceases to flow to relays 84 and 85 along path 92 and switches 55 and 86 open, ending the sequence. If paper remains in the priority pockets, the light beam to photo cell 61 remains broken and normally open photo-cell switch 94 remains closed so that subsequent depressions of switch 53 will continue to advance stepping motor 52, and release material in sequence from the priority pockets. When no more paper remains in the priority pockets, light again falls on photo-cell 61 allowing photo-cell switch 94 to open and switch 80 to close, thereby switching the circuit back to its normal sequence. As will be explained with reference to FIG. 5, during operation of priority gates 31 through 40, stepping motors 50 and 51 do not advance resulting in resumption of the normal sequence at the point where it was initially interrupted by the photo-cell over-riding circuitry.

The circuit of FIG. 4 is designed to handle two problem situations which arise in the distribution of material. The first involves the insertion of paper in one of the priority slots when the circuitry is in its normal mode of operation after push-button 53 has been depressed. This contingency could cause normally closed switch 80 to open prior to completion of the three second time interval and the selected solenoid gate to close before the material has been released. This problem is solved in the present development by relay 93 and its corresponding switch 99. Normally closed switch 99 is caused to open as relay 93 is energized. When switch 99 is in its open position no energy can flow to relay 62 as photo-cell switch 94 closes and switch 80 must therefore remain in its closed position insuring that the normal operation is not interrupted during the three second interval. In operation, relay 93 is energized the instant the three second timer begins passing current to switch 80. If the light beam to photo-cell 61 is broken thereafter, closing normally open photo-cell switch 94, current flowing from the 110 volt A.C. source to point 97 cannot reach relay 62 because switch 99 is open. As the three second timer falls off, however, energy ceases to flow to relay 93 and switch 99 closes. This allows current to flow through photo-cell switch 94 energizing relay 62 in wait of the next operation of pushbutton 53.

The second potential problem arises when the last sheet of paper is removed from the priority pockets during the three second interval in priority sequence allowing light to fall upon photo-cell 61, thereby opening photo-cell switch 94. This chain of events could cause switch 81, closed during the priority operation, to open during the three second time interval. Relay 83 and the corresponding switch 95 avoid this difficulty in the present invention. As energy begins to flow from the three second timer 91 through switch 81, closed in priority operation, relay 83 is energized by current passing along current path 82 thereby closing normally open switch 95 and holding switch 95 closed as long as current passes along current path 82 i.e. for the three second interval. In this state, the opening or closing of photo-cell switch 94 has no effect on the current flowing from the 110 volt A.C. source to relay 62 because current is allowed to bypass the photo-cell branch and flow through switch 95 to point 97. This insures that the circuit remains in priority operation through the full three second interval even through the last sheet of paper is removed from the priority pocket allowing light to once again fall on photo-cell 61 opening photo-cell switch 94. As three second timer 91 falls off, energy ceases to flow through switch 81 along current path 82 to relay 83 and switch 95 is allowed to open. With switches 94 and 95 open switch 81 opens closing switch 80 causing the system to revert back to normal operation and resume the sequence where it was initially interrupted.

The circuitry for advancing stepping motors 50, 51 and 52 is seen in FIG. 5. Before beginning operation, prior to pressing button 53 shown in FIG. 4, switches 55 and 86 corresponding to relays 84 and 85 respectively of FIG. 4 are open. Switches 80 and 81 corresponding to relay 62 of FIG. 4 are closed and open respectively. As button 53 of FIG. 4 is depressed switches 55 and 86 of FIG. 5 are closed, as described above sending current along current path 112 of FIG. 5 and through switch 96 advancing stepping motor 50 one step. After three second timer 91 falls off, switches 55 and 86 are open again as described with references to discussion of FIG. 4 operation. Stepping motor 50 is advanced one step with each depression of input switch 53 until stepping motor 50 causes its corresponding stepping switch to reach its 16th position shown as switch 98 in FIGS. 4 and 5. As stepping motor 50 closes switch 98, stepping motor 51 is energized and advanced one position thereby opening previously closed switch 96 temporarily removing stepping motor 50 from the circuit. For the next 16 operations of the circuitry, current passing along current path 112 passes through switch 98 advancing stepping motor 51 one step at a time until it reaches its 16th position closing switch 96. Closing switch 96 causes stepping motor 50 to advance one step disengaging stepping motor 51 by opening switch 98. Thus, stepping motors 50 and 51 are alternately caused to proceed in a sequential fashion through 16 steps. This circular operation of the circuitry causes pocket gates 1 through 30 to open in sequence returning to gate 1 after pocket 30 has been emptied. This sequence of operation is interrupted only by insertion of paper in a priority pocket which, as described above, breaks the light beam falling upon photo-cell 61 and shifting the sequence to priority pockets. Paper inserted in the priority pocket breaks the light beam falling on photo-cell 61 causing photo-cells switch 94 to close energizing relay 62 of FIG. 4. This sequence of events opens switch 80 and closes switch 81 shown in FIG. 5 thereby blocking input current to stepping motors 50 and 51 and causing priority stepping motor 52 to advance one step with each incoming electrical pulse. Stepping motor 52 continues to operate one step at a time releasing copy contained in pockets 31 through 40 in sequence, reverting back to pocket 31 after releasing the copy from pocket 40. When the last piece of written matter is removed from priority pockets 31 through 40 and three second timer 91 falls off, switch 80 closes and switch 81 opens causing subsequent input impulses to follow along current path 112 advancing either stepping motor 50 or stepping motor 51 depending upon the condition of switches 96 and 98 respectively.

Thus, it can be seen from the preceeding detailed description of the preferred embodiment, that the present invention teaches a means of sequentially distributing material to remote points and further provides a simple means of handling priority matter.

There are of course many possible alternative embodiments of the present invention. Various additional changes, modifications, and variations could be made in the arrangements, operation and details of the construction of the elements disclosed herein without departing from the spirit and the scope of the invention.

I claim:

1. An electronic copy sender for sequentially distributing material comprising:
   holding means for receiving and holding material for subsequent release;
   releasing means for releasing material from said holding means, said releasing means having a first and a second position, said first position for preventing release of material from said holding means, and said second position for allowing release of material from said holding means;
   transducer means for moving said releasing means from said first to said second position in response to an electrical signal and for moving said releasing means from said second to said first position upon termination of said electrical signal;
   control means comprising an electronic circuit having a set of advancing means for advancing a series of switches, said advancing means being connected for alternate operation for sequentially selecting one of said releasing means and directing said electrical signal to the selected one of said releasing means;
   signal means for sending electrical signals to the selected one of said transducer means thereby operating said releasing means, releasing material from said holding means.

2. An electronic copy sender for sequentially distributing material substantially as claimed in claim 1 wherein:
said holding means comprises a series of pockets each having four sides and a moveable gate forming a back closure.

3. An electronic copy sender for sequentially distributing material substantially as claimed in claim 2 wherein:
said releasing means comprises a series of moveable gates each corresponding to one of said pockets and hinged to said holding means for movement relative to said holding means.

4. An electronic copy sender for sequentially distributing material substantially as claimed in claim 3 wherein:
said transducer means comprises a solenoid operably connected to said releasing means by mechanical linkage for moving said releasing means to its second position in response to an electrical signal and for returning said releasing means to its first position upon termination of said electrical signal.

5. An electronic copy sender for sequentially distributing material substantially as claimed in claim 1 wherein:
said signal means comprises a series of push buttons remotely located with respect to said holding means for individual remote operation of said releasing means.

6. An electronic copy sender for sequentially distributing material substantially as claimed in claim 1 wherein said control means further comprises:
an electronic circuit having a photo-electric means for sensing the presence of material in certain designated pockets and automatically interrupting the regular sequence for transferring sequential control when material is present in said designated pockets,
an electronic circuit having a photo-electric means for sensing the absence of material in said designated pockets and automatically transferring sequential control back to said regular sequence resuming said regular sequence where originally interrupted.

7. An electonic copy sender for sequentially distributing material substantially as claimed in claim 6 wherein said photo-electric means comprises:
a photo-cell positioned along the center line of a series of holes defined by the shelves of the pockets of said holding means for receiving light from a light source also positioned along said center line.

8. An electronic copy sender for sequentially distributing material substantially as claimed in claim 6 wherein said advancing means comprises stepping motors, and said control means further comprises:
at least one relay for preventing said electronic circuit from transferring sequential control from said regular sequence to said designated pockets during pendency of the system time interval; and further, from transferring sequential control from said designated pockets to said regular sequence during pendency of the system time interval.

9. An electronic copy sender for sequentially distributing written material comprising:
tiers of inclined shelves forming pockets for receiving and holding written material, passage of said written material through each of said pockets being blocked by a movable gate so that written material deposited in one of said pockets is held pending displacement of the movable gate associated with said one of said pockets;
solenoid means for displacing said movable gate, said solenoid means responsive to electrical signals initiated by manually operable switches;
primary and secondary sequential switches, driven by advancing means said sequential switches for selecting sequentially a certain one of said movable gates pending operation of said manually operable switches, said secondary sequential switches for sequentially selecting among regular gates, said primary sequential switches for sequentially selecting among priority gates;
photo-electric means for sensing the presence of written material in said priority pockets and switching control to said priority pockets, said photo-electric means for automatically shifting selection from said priority gates to said regular gates upon completion of removal of written material from said priority pockets.

10. An electronic copy sender for sequentially distributing written material substantially as claimed in claim 9 wherein:
said movable gates comprise rectangular grids movably attached to said tiers of inclined shelves by bearings at the ends of said movable gates, said rectangular grids having first and second positions, each of said movable gates being tight against the lower edge of its corresponding inclined shelf in said first position and being substantially parallel to said inclined shelf in said second position, said first position for holding written material in said pockets, said second position for allowing said written material to slide off said inclined shelf and out of said pocket.

11. An electronic copy sender for sequentially distributing material comprising:
holding means for receiving and holding material for subsequent release;
releasing means for releasing material from said holding means, said releasing means having a first and a second position, said first position for preventing release of material from said holding means, and said second position for allowing release of material from said holding means;
transducer means for moving said releasing means from said first to said second position and for moving said releasing means from said second to said first position;
control means for sequentially selecting one of several of said transducer means for sequential operation of said releasing means said control means having a photo-electric means for sensing the presence of material in certain designated pockets and automatically interrupting the regular sequence transferring sequential control to a priority sequence when material is present in said designated pockets, and for sensing the absence of material in said designated pockets and automatically transferring sequential control back to said regular sequence resuming said regular sequence where originally interrupted.

12. An electronic copy sender for sequentially distributing material substantially as claimed in claim 11 wherein said photo-electric means comprises;

a photo-cell positioned along the center line of a series of holes defined by the shelves of the pockets of said holding means for receiving light from a light source also positioned along said center line.

13. An electronic copy sender for sequentially distributing material substantially as claimed in claim 11 wherein said control means further comprises:

at least one relay for preventing said electronic circuit from transferring sequential control from said regular sequence to said designated pockets during pendency of the system time interval; and further, from transferring sequential control from said priority sequence to said regular sequence during pendency of the system time interval.

* * * * *